United States Patent
Kishimoto et al.

(10) Patent No.: US 10,686,994 B2
(45) Date of Patent: Jun. 16, 2020

(54) IMAGING DEVICE, AND SOLID-STATE IMAGING ELEMENT USED FOR SAME

(71) Applicant: PANASONIC INTELLECTUAL PROPERTY MANAGEMENT CO., LTD., Osaka (JP)

(72) Inventors: Masaya Kishimoto, Osaka (JP); Haruka Takano, Osaka (JP); Junichi Matsuo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/946,270

(22) Filed: Apr. 5, 2018

(65) Prior Publication Data
US 2018/0227475 A1    Aug. 9, 2018

Related U.S. Application Data

(63) Continuation of application No. PCT/JP2016/004468, filed on Oct. 4, 2016.
(Continued)

(51) Int. Cl.
*H04N 5/235* (2006.01)
*G01C 3/06* (2006.01)
(Continued)

(52) U.S. Cl.
CPC ............ *H04N 5/2352* (2013.01); *G01C 3/06* (2013.01); *G01S 7/4865* (2013.01); *G01S 17/10* (2013.01);
(Continued)

(58) Field of Classification Search
CPC .. H04N 5/2352; H04N 5/2354; H04N 5/2353; H04N 5/3559; G01S 7/4865;
(Continued)

(56) References Cited

U.S. PATENT DOCUMENTS

2012/0075534 A1*   3/2012   Katz .................... H04N 9/3182
                                                                    348/602
2013/0201288 A1    8/2013   Billerbeck et al.
(Continued)

FOREIGN PATENT DOCUMENTS

| EP | 2 796 894 A1 | 10/2014 |
|---|---|---|
| JP | 2013-076645 A | 4/2013 |
| WO | 2013/094062 A1 | 6/2013 |

OTHER PUBLICATIONS

International Search Report and Written Opinion issued in International Patent Application No. PCT/JP2016/004468, dated Dec. 20, 2016; with partial English translation.
(Continued)

*Primary Examiner* — Jason A Flohre
(74) *Attorney, Agent, or Firm* — McDermott Will & Emery LLP

(57) ABSTRACT

An imaging device includes: a light source that applies light at a timing according to a light emission control signal; a light receiver that performs exposure to reflected light from an object at different timings according to an exposure control signal, and outputs exposure signals generated as a result of the exposure; a calculator that calculates a distance to the object; and a controller that outputs the light emission control signal and the exposure control signal for any of: modulating a length of a light emission period and an exposure period by increasing or decreasing the number of pulses of each of the light emission control signal and the exposure control signal; and modulating a repetition sequence of the light emission period and the exposure period while maintaining a phase relationship between the light emission control signal and the exposure control signal, randomly or in conformity with a specific rule.

8 Claims, 8 Drawing Sheets

Related U.S. Application Data

(60) Provisional application No. 62/239,300, filed on Oct. 9, 2015.

(51) Int. Cl.
    *G01S 17/89*     (2020.01)
    *G01S 17/10*     (2020.01)
    *G01S 7/4865*     (2020.01)
    *G06T 7/514*     (2017.01)
    *H04N 5/355*     (2011.01)

(52) U.S. Cl.
    CPC .............. *G01S 17/89* (2013.01); *G06T 7/514* (2017.01); *H04N 5/2353* (2013.01); *H04N 5/2354* (2013.01); *H04N 5/3559* (2013.01)

(58) Field of Classification Search
    CPC ......... G01S 17/89; G01S 17/10; G06T 7/514; G01C 3/06
    See application file for complete search history.

(56) References Cited

U.S. PATENT DOCUMENTS

| | | |
|---|---|---|
| 2014/0125766 A1 | 5/2014 | Cohen et al. |
| 2015/0124240 A1* | 5/2015 | Wilks ...................... G01S 17/36 356/5.01 |
| 2015/0285623 A1 | 10/2015 | Tachibana |
| 2015/0341573 A1* | 11/2015 | Matsuo .................. H04N 5/332 348/135 |
| 2015/0355330 A1* | 12/2015 | Oberhammer .......... G01S 17/36 356/5.01 |
| 2016/0349359 A1* | 12/2016 | Nevet ................... G01S 7/4865 |

OTHER PUBLICATIONS

Extended European Search Report issued in European Patent Application No. 16853261.2, dated Sep. 24, 2018.

\* cited by examiner

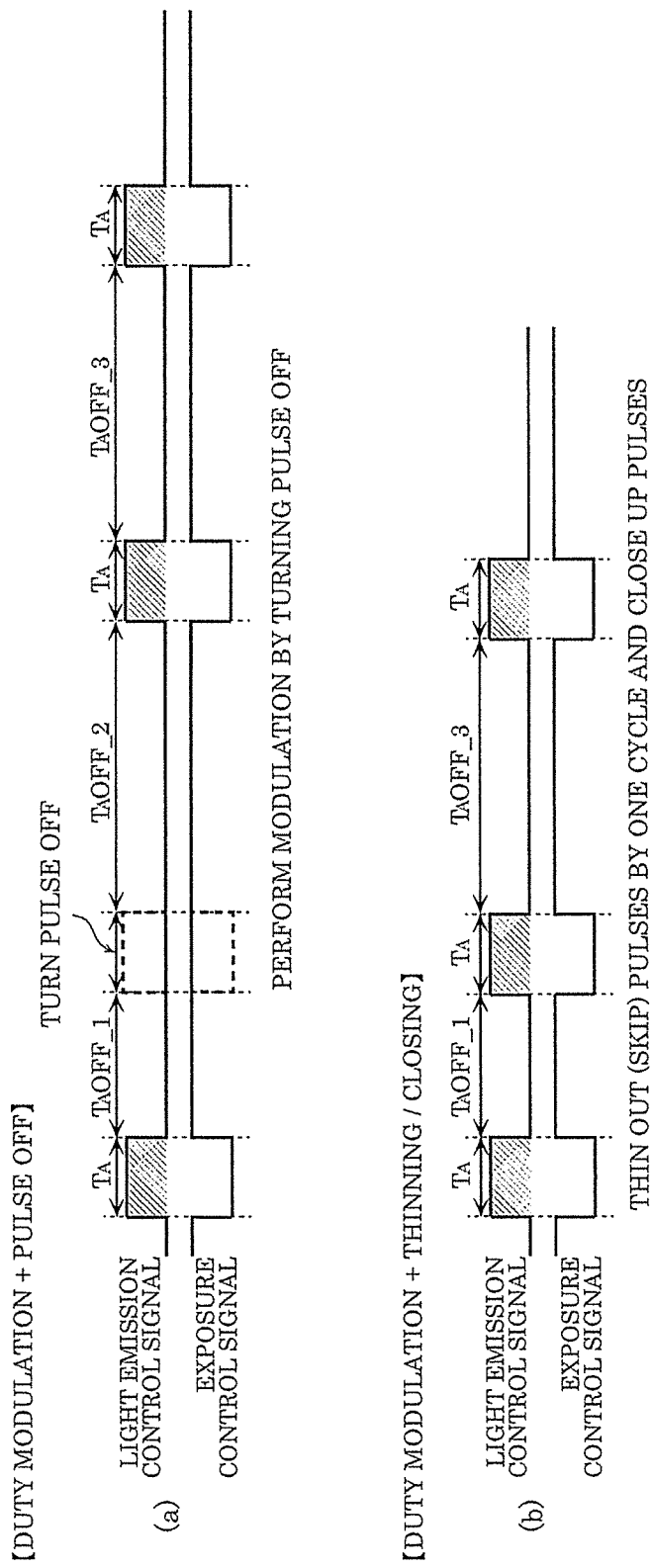

IMAGING DEVICE, AND SOLID-STATE IMAGING ELEMENT USED FOR SAME

CROSS REFERENCE TO RELATED APPLICATIONS

This application is a U.S. continuation application of PCT International Patent Application Number PCT/JP2016/004468 filed on Oct. 4, 2016, claiming the benefit of priority of U.S. Provisional Application No. 62/239,300 filed on Oct. 9, 2015, the entire contents of which are hereby incorporated by reference.

BACKGROUND

1. Technical Field

The present disclosure relates to an imaging device, and a solid-state imaging element used for the same.

2. Description of the Related Art

In time of flight (TOF) distance-measuring calculation, at least two exposure signals are obtained for reflected light from an object, and the time difference or the phase difference between light emission and light reception (the time required for light to travel to and from the object) is calculated from the obtained exposure signal amounts, to perform distance-measuring calculation.

The distance-measuring calculation typically involves difference calculation. The influence of background light, such as sunlight, that is applied to an object or enters an imaging device (TOF camera) in a given light amount during an exposure period is differential-removed, to suppress the influence.

In the case where there are a plurality of TOF cameras, however, in one TOF camera, emitted light or reflected light from another imaging device (other TOF camera) has a temporal change during an exposure period of the TOF camera because the light has cyclicity. Therefore, the influence component of interference light from the other TOF camera included in each of a plurality of exposure signals necessary for distance-measuring calculation is not the same. In other words, even when difference calculation included in distance-measuring calculation is performed, the influence of interference light cannot be eliminated. This causes a distance-measuring error.

Japanese Unexamined Patent Application Publication (Translation of PCT Application) No. 2013-76645 discloses the following conventional TOF distance image generation device. In the generation of a distance image of a photographing space, to accurately perform distance measurement even in the case where a plurality of TOF distance image generation devices are simultaneously present in the same photographing space, the TOF distance image generation device performs control as follows. While fixing a light emission (ON) period of modulation light applied from a light source and a charge accumulation period in each unit accumulation part of a charge accumulation part, light emission and accumulation are controlled so that the cycle length is changed for each modulation cycle. The cycle length is changed by adding an additional time different for each cycle to a predetermined fixed modulation cycle Ts. An electric charge acquired during the additional time is discarded.

SUMMARY

Typically, a TOF camera has a very short light emission and exposure period of several 10 ns, and so needs to perform light emission and exposure operation several 1000 times or more in one frame.

The following problem thus arises. In the case where, in the TOF camera, an additional time is added to each light emission cycle for irradiation light to modulate the cycle of the light emission signal to thereby disrupt the cyclicity of light emission and uniformize the interference light component included in each exposure signal necessary for distance-measuring calculation, the light emission period and the exposure period increase by the additional time, which leads to a decrease in frame rate.

In view of the problem stated above, the present disclosure has an object of providing an imaging device that can suppress an interference phenomenon without a decrease in frame rate, and a solid-state imaging element used for the same.

To solve the problem stated above, an imaging device according to one aspect of the present disclosure is an imaging device that measures a distance to an object by applying light to and receiving reflected light from the object, the imaging device including: a controller that outputs a light emission control signal and an exposure control signal; a light source that applies the light at a timing according to the light emission control signal; a light receiver including a solid-state imaging element that performs exposure to the reflected light from the object resulting from the applied light at a plurality of different timings according to the exposure control signal, and outputs a plurality of exposure signals generated as a result of the exposure at the plurality of different timings; and a calculator that receives the plurality of exposure signals and calculates the distance, wherein the controller outputs the light emission control signal and the exposure control signal for any of: modulating a length of a light emission period of the light source and an exposure period of the solid-state imaging element for generating each of the plurality of exposure signals, by increasing or decreasing the number of pulses of each of the light emission control signal and the exposure control signal; and modulating a repetition sequence of the light emission period and the exposure period while maintaining a phase relationship between the light emission control signal and the exposure control signal, randomly or in conformity with a specific rule.

The light emission period and the exposure period may be divided into a plurality of types of periods that differ from each other in the phase relationship between the light emission control signal and the exposure control signal, and the controller may modulate a length of at least one period of the plurality of types of periods obtained by dividing the light emission period and the exposure period, or modulate a repetition sequence of the plurality of types of periods obtained by dividing the light emission period and the exposure period.

The light receiver may detect background light or an offset component, based on an exposure signal output in one period of the plurality of types of periods obtained by dividing the light emission period and the exposure period.

The light emission period and the exposure period of each of the plurality of types may be divided into 1/N in one frame, N being a natural number of 2 or more, and the light emission period and the exposure period of each of the plurality of types divided into 1/N may be repeated N times, and a length of the light emission period and the exposure period per one time may be modulated.

The controller may output the light emission control signal for modulating a ratio between a light emission state and a non-light emission state in the light emission period, or output the exposure control signal for modulating a ratio between an exposure state and a non-exposure state in the exposure period.

The ratio between the light emission state and the non-light emission state and the ratio between the exposure state and the non-exposure state may be increased or decreased randomly or in conformity with the specific rule.

The ratio between the light emission state and the non-light emission state and the ratio between the exposure state and the non-exposure state may be modulated by turning off a light emission pulse and an exposure pulse randomly or in conformity with the specific rule, the light emission pulse being the light emission control signal, and the exposure pulse being the exposure control signal.

The ratio between the light emission state and the non-light emission state and the ratio between the exposure state and the non-exposure state may be modulated by skipping a pulse period of at least one cycle for each of a light emission pulse and an exposure pulse randomly or in conformity with the specific rule, the light emission pulse being the light emission control signal, and the exposure pulse being the exposure control signal.

The imaging device may measure the distance to the object based on a time of flight (TOF) method.

A solid-state imaging element according to one aspect of the present disclosure is a solid-state imaging element used for an imaging device that measures a distance to an object by applying light to and receiving reflected light from the object, the imaging device including: a controller that outputs a light emission control signal and an exposure control signal; a light source that applies the light at a timing according to the light emission control signal; the solid-state imaging element; and a calculator that receives a plurality of exposure signals and calculates the distance, the controller outputting the light emission control signal and the exposure control signal for any of: modulating a length of a light emission period of the light source and an exposure period of the solid-state imaging element for generating each of the plurality of exposure signals, by increasing or decreasing the number of pulses of each of the light emission control signal and the exposure control signal; and modulating a repetition sequence of the light emission period and the exposure period while maintaining a phase relationship between the light emission control signal and the exposure control signal, randomly or in conformity with a specific rule, wherein the solid-state imaging element performs exposure at a plurality of different timings according to the exposure control signal, and outputs the plurality of exposure signals generated as a result of the exposure at the plurality of different timings.

The solid-state imaging element may output the plurality of exposure signals of types that differ from each other in the phase relationship between the light emission control signal and the exposure control signal.

The solid-state imaging element may detect background light or an offset component from one of the plurality of exposure signals of the types.

The solid-state imaging element may be a charge coupled device (CCD) solid-state imaging element.

With the imaging device and the solid-state imaging element used for the same according to the present disclosure, an interference phenomenon can be suppressed without an increase in exposure period or a decrease in frame rate.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 is a sequence diagram illustrating light emission/exposure timing in an imaging device according to a variation of Embodiment 2.

DETAILED DESCRIPTION OF THE EMBODIMENTS

The following describes an imaging device and a solid-state imaging element used for the same according to embodiments of the present disclosure with reference to drawings. The embodiments described below each show a specific example of the present disclosure. The numerical values, shapes, materials, structural elements, the arrangement and connection of the structural elements, etc. shown in the following embodiments are mere examples, and do not limit the scope of the present disclosure.

In the following, description detailed more than necessary may be omitted. For example, detailed description of well-known matters or repeated description of the substantially same structures may be omitted. This is to avoid unnecessarily redundant description and facilitate the understanding of a person skilled in the art.

In the embodiments described below, "light emission/exposure" is used as an expression relating to light emission and exposure. For example, "light emission/exposure" denotes light emission and exposure. "Light emission/exposure timing" denotes light emission timing and exposure timing. "Light emission/exposure operation" denotes light emission operation and exposure operation. "Light emission/exposure period" denotes a light emission period and an exposure period. "Length of a light emission/exposure period" denotes the length of a light emission period and the length of an exposure period. "Repetition of light emission/exposure" denotes repetition of light emission and repetition of exposure. "Operation sequence (repetition sequence) of a light emission/exposure period" denotes the operation sequence (repetition sequence) of a light emission period and the operation sequence (repetition sequence) of an exposure period.

Embodiment 1

Figure 1:
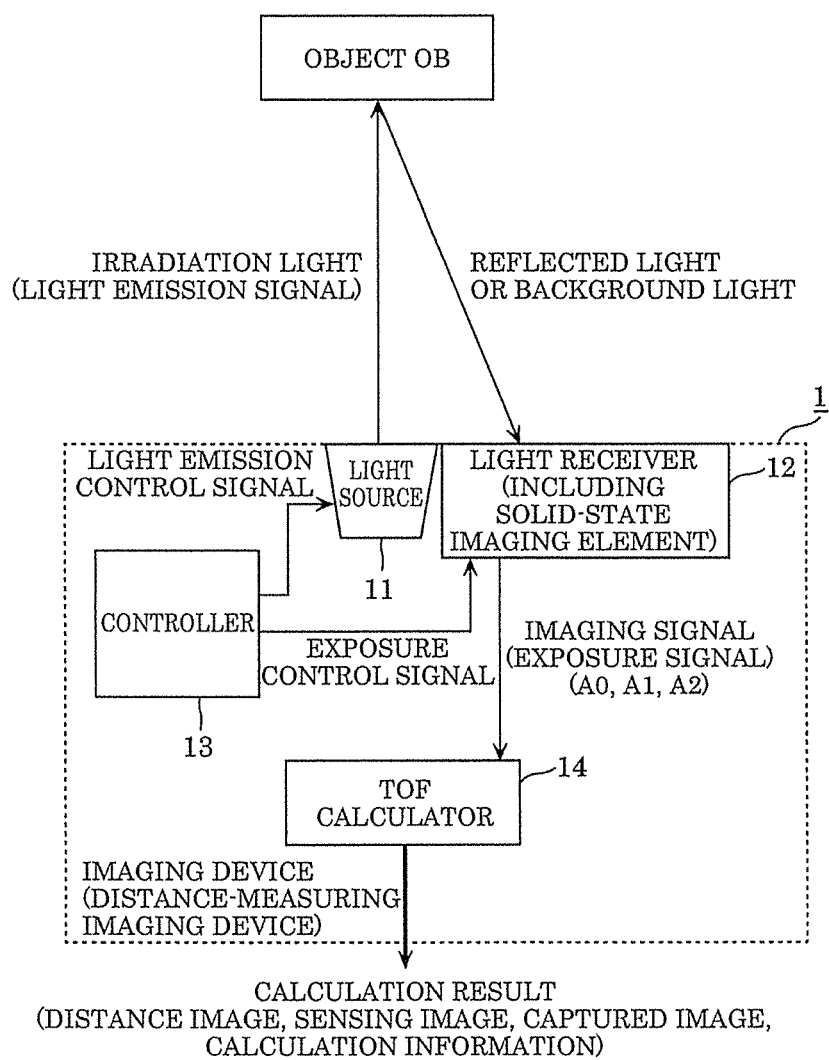
FIG. 1 is a functional block diagram illustrating an example of the schematic structure of an imaging device (distance-measuring imaging device) according to Embodiment 1.

FIG. 1 is a functional block diagram illustrating an example of the schematic structure of an imaging device (distance-measuring imaging device) according to Embodiment 1. Imaging device 1 illustrated in the drawing applies light to and receives reflected light from an object, to measure the distance to the object (or sense the object). Imaging device 1 includes light source 11, light receiver 12, controller 13, and TOF calculator 14. The drawing also illustrates object OB. Imaging device 1 measures the distance from imaging device 1 to object OB (i.e. senses object OB).

Light source 11 is a light source that applies light (irradiation light, pulse light, light emission signal) at timing indicated by a light emission control signal. In this embodiment, light source 11 irradiates object OB with light according to the timing of receiving a light emission control signal generated by controller 13. For example, light source 11 includes a drive circuit, a capacitor, and a light-emitting element, and emits light by supplying a charge held in the capacitor to the light-emitting diode. The light-emitting element may be a laser diode (LD), a light-emitting diode (LED), or the like.

Controller 13 is a controller that outputs a light emission control signal and an exposure control signal. In detail, controller 13 generates a light emission control signal for instructing light application to a measurement object (object OB), and an exposure control signal for instructing exposure to reflected light from the object. For example, controller 13 is composed of a processing unit such as a microcomputer. The microcomputer includes a processor (microprocessor), memory, and the like. The processor executes a drive program stored in the memory, thus outputting the light emission control signal and the exposure control signal. Controller 13 may use FPGA, ISP, or the like, and may be single hardware or multiple hardware. Controller 13 may include separate controllers, i.e. a controller for generating the light emission control signal and a controller for generating the exposure control signal.

Light receiver 12 includes a solid-state imaging element (image sensor, solid-state imaging device). Light receiver 12 is exposed to reflected light at timing indicated by the exposure control signal, to output an imaging signal (exposure signal) indicating the exposure amount.

Figure 2:
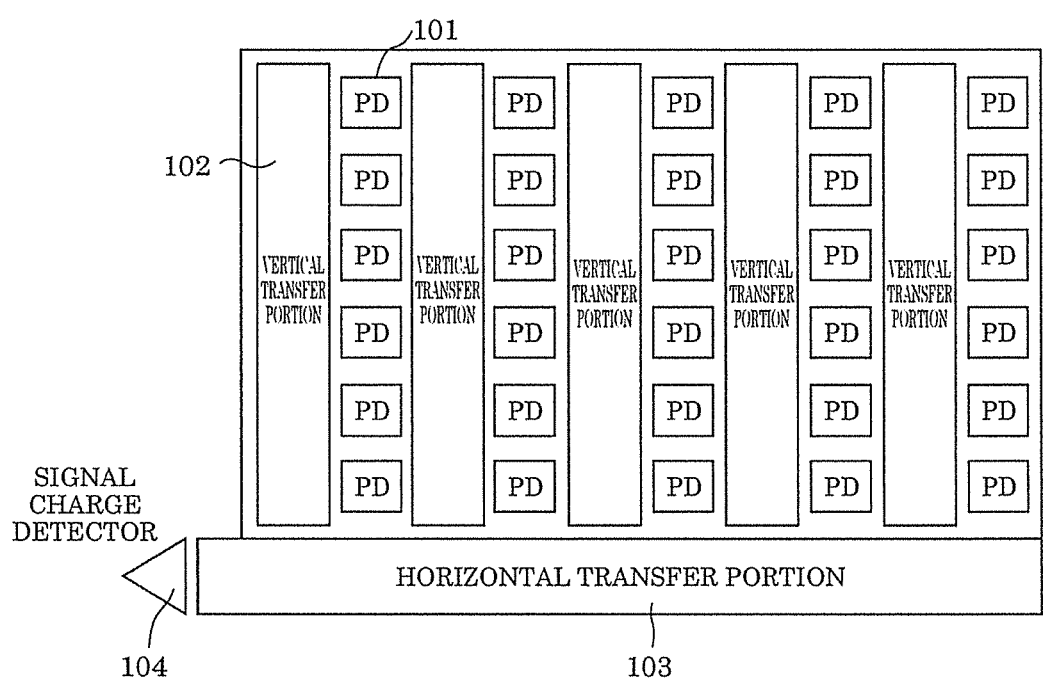
FIG. 2 is a schematic diagram illustrating a solid-state imaging element according to Embodiment 1.

FIG. 2 is a schematic diagram illustrating the solid-state imaging element according to Embodiment 1. As illustrated in the drawing, the solid-state imaging element according to this embodiment is a charge coupled device (CCD) solid-state imaging element, and includes photodiode 101 (PD, light-receiving region), vertical transfer portion 102, horizontal transfer portion 103, and signal charge detector 104. Photodiode 101 converts received light into a charge. Vertical transfer portion 102 includes a plurality of gates, and transfers charges read from photodiodes 101 sequentially in the vertical direction. Horizontal transfer portion 103 transfers charges received from vertical transfer portions 102 sequentially in the horizontal direction. Signal charge detector 104 sequentially detects the charges received from horizontal transfer portion 103, converts each charge into a voltage signal, and outputs the voltage signal.

Here, in a state where a readout gate from photodiode 101 to vertical transfer portion 102 is open, a substrate voltage is controlled according to an exposure control signal, and photodiode 101 photoelectrically converts light in a period during which the exposure control signal is Low. A charge generated as a result is accumulated in vertical transfer portion 102.

In FIG. 2, by using a CCD image sensor (CCD solid-state imaging element), a global reset, i.e. an operation of resetting the plurality of photodiodes 101 at once, is possible. Highly accurate distance measurement can be achieved in this way. However, the solid-state imaging element used in this embodiment is not limited to a CCD image sensor. The same imaging device can be achieved even when any other solid-state imaging element (image sensor) such as a complementary metal-oxide semiconductor (CMOS) image sensor (CMOS solid-state imaging element) is used in view of other requirements of an imaging device.

Light receiver 12 includes, for example, an optical lens, a bandpass filter, a cover glass, and a circuit such as an A/D converter for generating and outputting imaging data (raw data), according to need.

TOF calculator 14 is a calculator that calculates the distance to the object using an exposure signal. In detail, TOF calculator 14 outputs a calculation result (distance image, sensing image, captured image, calculation information), based on a plurality of exposure signals received from light receiver 12.

TOF calculator 14 is composed of a processing unit such as a microcomputer, as with controller 13. TOF calculator 14 calculates the distance, by a processor executing a calculation program stored in memory. TOF calculator 14 may use FPGA, ISP, or the like, and may be single hardware or multiple hardware, as with controller 13.

A typical distance-measuring imaging device is described below with reference to FIGS. 3 and 4, to facilitate understanding of the below-mentioned embodiments. A typical driving method described below is executed by a drive controller or the like.

Figure 3:
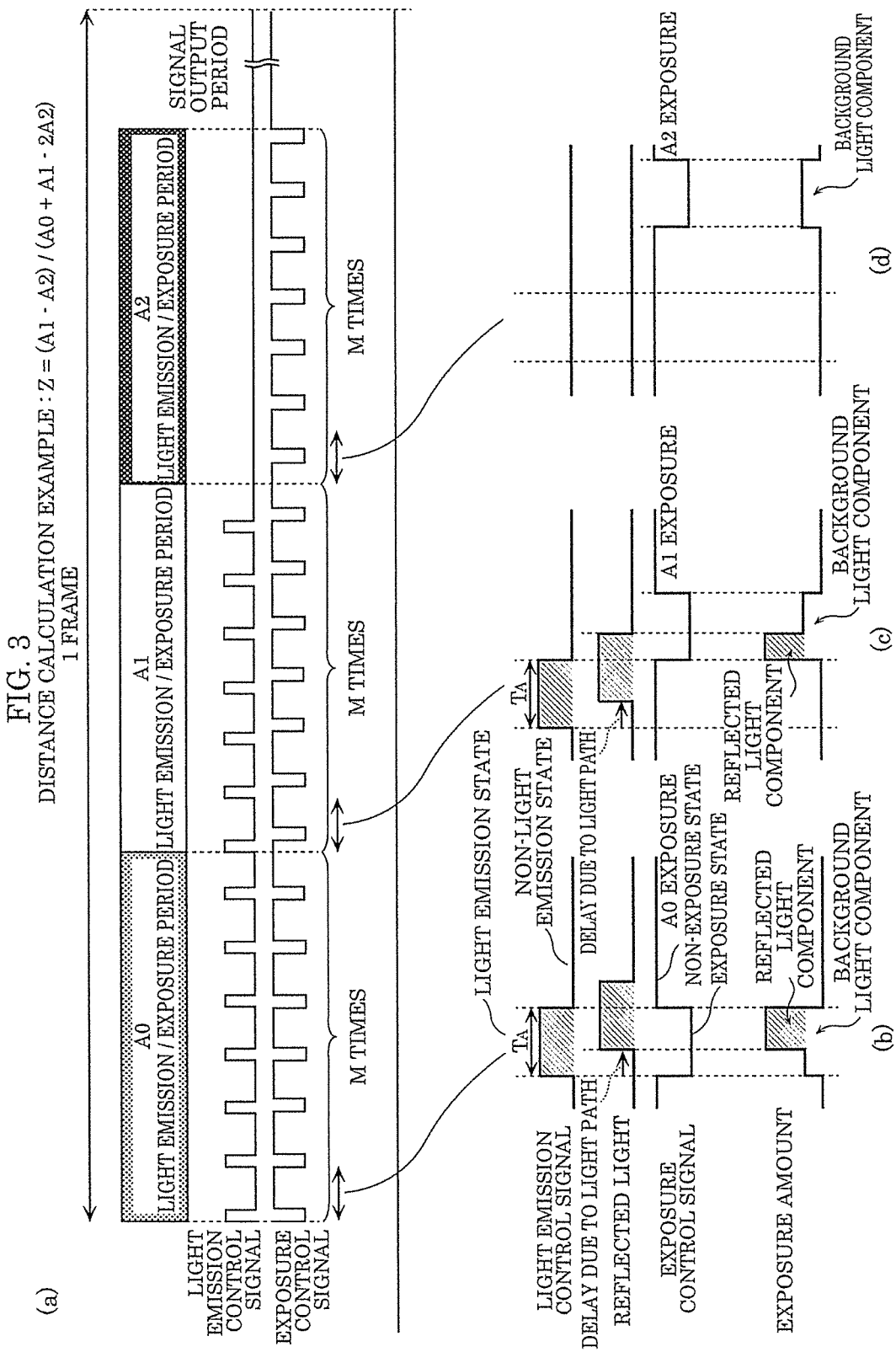
FIG. 3 is a sequence diagram illustrating light emission/exposure timing in a typical imaging device.

FIG. 3 is a sequence diagram illustrating light emission/exposure timing in the typical distance-measuring imaging device. In more detail, (b), (c), and (d) in FIG. 3 are diagrams illustrating typical drive timing (driving method) in the case of calculating the distance from exposure signals detected at three timings different in the phases of the light emission control signal and exposure control signal, and (a) in FIG. 3 is a diagram illustrating an example of timing in one frame.

In (a) in FIG. 3, in one frame period, A0 light emission/exposure operation, A1 light emission/exposure operation, and A2 light emission/exposure operation that differ in the phase relationship between the light emission control signal and the exposure control signal are performed, and exposure signals A0 to A2 detected in the light emission/exposure periods are output in a signal output period, to calculate the distance. Width $T_A$ of a light emission pulse depends on the distance range subjected to sensing, and is typically a very short time of several 10 ns for a sensing range of several m to several 10 m.

Therefore, exposure amounts A0 to A2 obtained for one pulse are very small. To attain distance measuring accuracy, it is necessary to repeatedly perform light emission operation and exposure operation several 1000 times or more (M times) in each light emission/exposure period and integrate the exposure signals, to thus detect a sufficient exposure signal amount.

(b) in FIG. 3 illustrates typical exposure timing (driving method) of exposure amount A0 for one pulse in the A0 light emission/exposure period of the first phase relationship. In a state where the light emission control signal is High (light emission state), (pulse) light is emitted from the light source, and reflected light reaches light receiver 12 with a delay due to the light path, i.e. a time delay difference corresponding to the round-trip distance from light source 11 to object OB. In the A0 light emission/exposure period, the light emission state (state where the light emission control signal is High) and the exposure state (state where the exposure control signal is Low) are synchronous. The components of reflected light and background light to which exposure is performed during this exposure state constitute exposure amount A0 for one pulse, and the sum obtained by performing this operation M times is exposure amount A0 output from light receiver 12.

(c) in FIG. 3 illustrates typical exposure timing (driving method) of exposure amount A1 for one pulse in the A1 light emission/exposure period of the second phase relationship. In the A1 light emission/exposure period, the exposure state starts when the light emission state ends. The sum obtained by performing this light emission/exposure operation M times is exposure amount A1.

(d) in FIG. 3 illustrates typical exposure timing (driving method) of exposure amount A2 for one pulse in the A2 light emission/exposure period of the third phase relationship. In the A2 light emission/exposure period, the light emission control signal is constantly off, and only exposure operation is performed without performing light emission operation. Hence, background light such as sunlight and offset components such as dark current components are detected as exposure amount A2. By calculating the difference of exposure amount A2 from exposure amounts A0 and A1, the influence of background light can be suppressed. In the case of performing the light emission and exposure control based on the above-mentioned phase relationships, distance Z to object OB is calculated as $Z=(A1-A2)/(A0+A1-2A2)$.

A typical distance-measuring imaging device in the case where there are a plurality of TOF cameras is described below.

Figure 4:
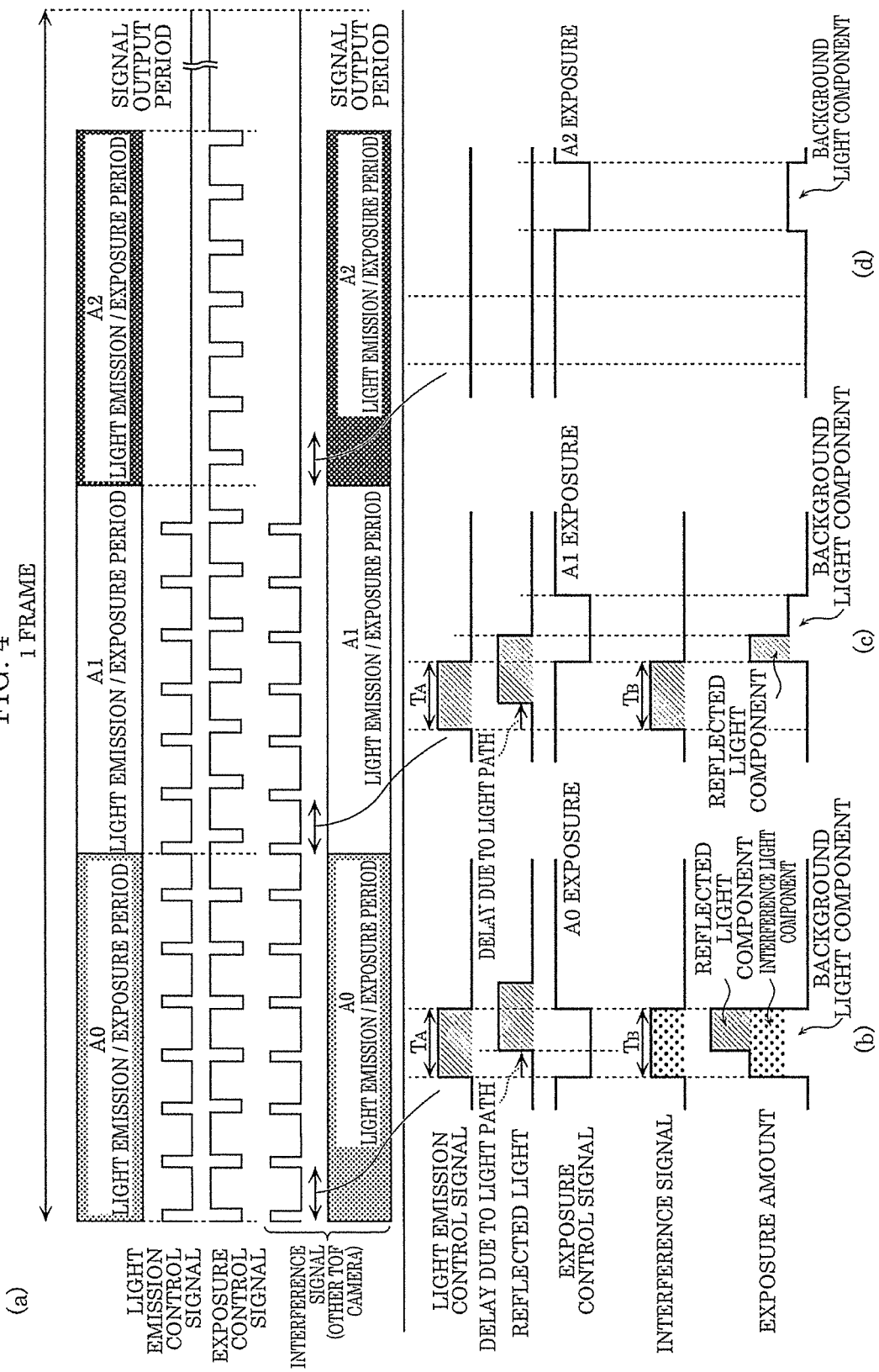
FIG. 4 is a sequence diagram illustrating light emission/exposure timing in the case where an interference signal is present, in the typical imaging device.

FIG. 4 is a sequence diagram illustrating light emission/exposure timing in the case where an interference signal is present, in the typical imaging device. (a) in FIG. 4 illustrates an example where two TOF cameras operate with the typical exposure timing (driving method) illustrated in FIG. 3. Due to the positional relationship with object OB, a time lag occurs between the light emission control signal of one TOF camera and the interference signal from the other TOF camera. Although the intensity of the light emission signal and the light intensity of the interference light differ, it is assumed here that the TOF camera and the other TOF camera are completely synchronous (i.e. have the same start and end times of one frame) and the intensity of the reflected light of the TOF camera and the light intensity of the interference signal are equal, to facilitate understanding.

(b) in FIG. 4 illustrates typical exposure timing (driving method) of exposure amount A0 in the case where the interference signal is present. Since the interference signal from the other TOF camera is present during the exposure state (exposure control signal: Low), exposure amount A0 includes the interference light component together with the reflected light component, which is integrated M times.

(c) in FIG. 4 illustrates typical exposure timing (driving method) of exposure amount A1. At the exposure timing of exposure amount A1, no interference light is present during the exposure state, so that exposure amount A1 includes only the reflected light component, with no interference light component being mixed in exposure amount A1.

(d) in FIG. 4 illustrates typical exposure timing (driving method) of exposure amount A2. Since no interference signal is present during the exposure state, no interference light component is mixed in exposure amount A2, as in exposure amount A1. Thus, only exposure amount A0 is influenced by the interference light, and exposure amounts A1 and A2 are not influenced by the interference light.

As illustrated in FIGS. 3 and 4, the typical distance-measuring imaging device has a problem in that only exposure amount A0 increases in signal amount as compared with the case where there is no interference, which causes a difference (error) in distance calculation result.

With imaging device 1 and the solid-state imaging element used for the same according to Embodiment 1, on the other hand, the light emission/exposure period is divided, and controller 13 outputs at least one of a light emission control signal and an exposure control signal that modulate at least one of: the length of each of the divided A0, A1, and A2 light emission/exposure periods; and the operation sequence (repetition sequence) of the A0, A1, and A2 light emission/exposure periods.

This is described in detail below, with reference to FIGS. 5 and 6.

Figure 5:
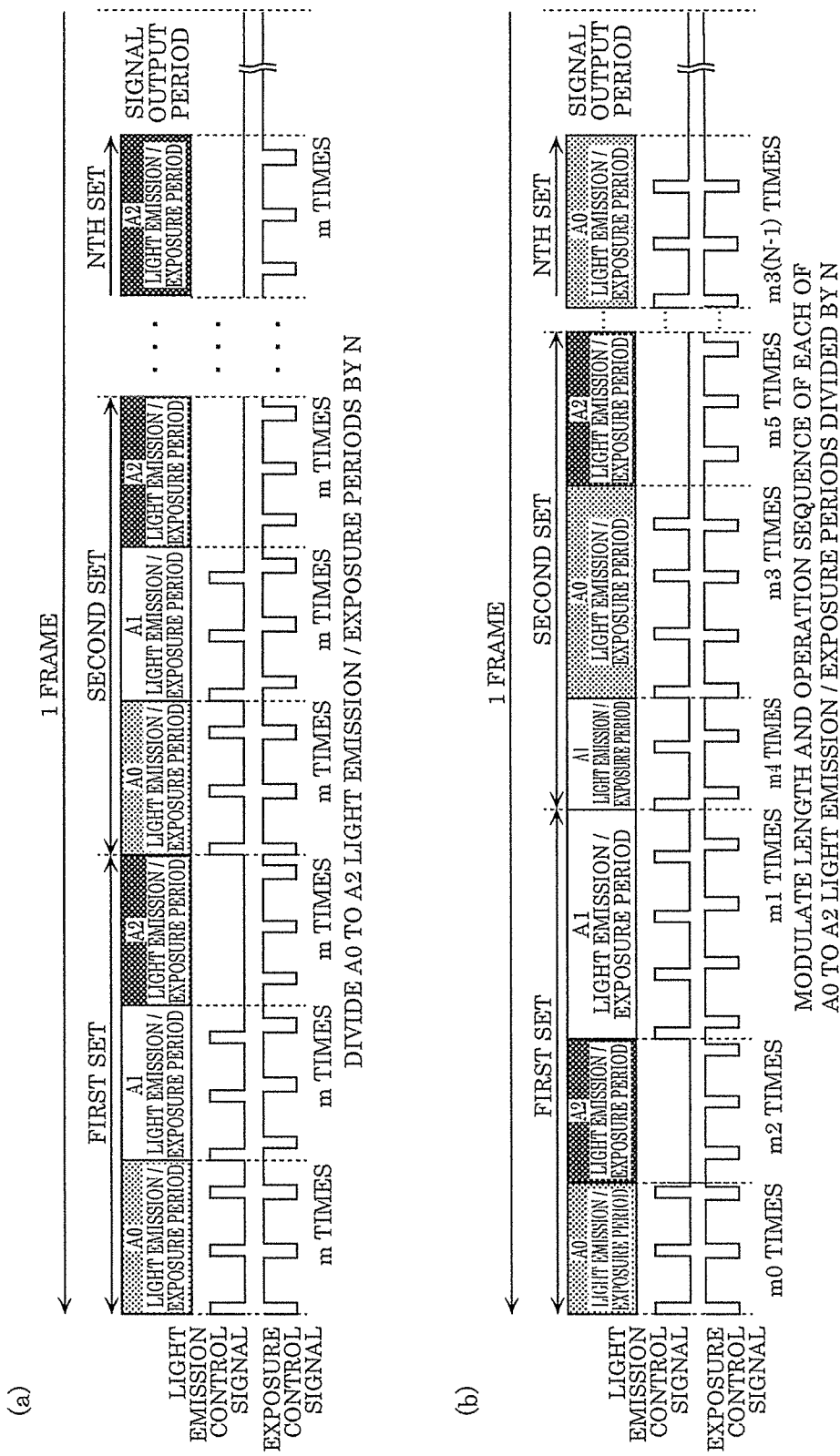
FIG. 5 is a sequence diagram illustrating light emission/exposure timing in the imaging device according to Embodiment 1.

FIG. 5 is a sequence diagram illustrating light emission/exposure timing in the imaging device according to Embodiment 1. FIG. 6 is a sequence diagram illustrating light emission/exposure timing in the case where an interference signal is present, in the imaging device according to Embodiment 1.

Figure 6:
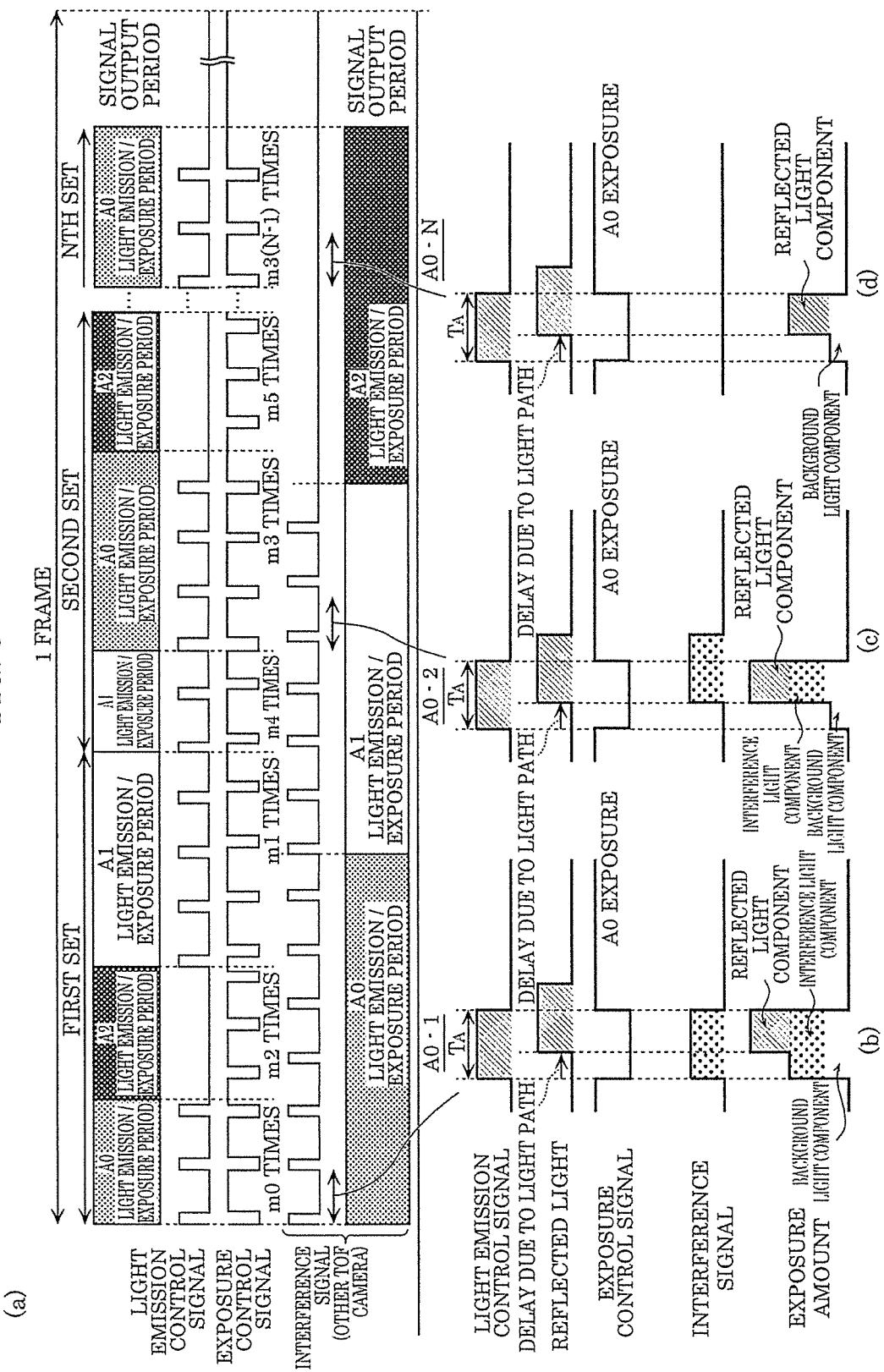
FIG. 6 is a sequence diagram illustrating light emission/exposure timing in the case where an interference signal is present, in the imaging device according to Embodiment 1.

As illustrated in FIGS. 5 and 6, this embodiment describes the case where the distance signal obtainment method is TOF, and specifically rectangular wave TOF (pulse TOF) that includes a phase in which no exposure is performed in light emission/exposure repetition. The distance signal obtainment method is, however, not limited to this.

An example of dividing the light emission/exposure period according to this embodiment is described below, with reference to (a) in FIG. 5. In (a) in FIG. 5, in one frame, the A0 light emission/exposure period, the A1 light emission/exposure period, and the A2 light emission/exposure period are divided into 1/N and performed N times, to modulate the length of the light emission/exposure period per one time. Since the total light emission/exposure period in one frame is equal to that before the division (m×N=M), detected exposure amounts A0, A1, and A2 are the same as those in the conventional example, and no decrease in frame rate occurs.

With the above-mentioned typical driving method, there is a time difference between the light emission/exposure periods, and, in the case where object OB is moving at high speed with respect to the frame rate, a deviation could arise in object OB in the A0 light emission/exposure period, the A1 light emission/exposure period, and the A2 light emission/exposure period. In (a) in FIG. 5, on the other hand, each light emission/exposure period is divided into 1/N and repeated, thus reducing the time difference between the exposure periods. This has an advantageous effect against a deviation due to the movement of object OB.

(b) in FIG. 5 illustrates an example of modulating, for each of the divided A0, A1, and A2 light emission/exposure periods, the length of the light emission/exposure period and the operation sequence of the A2 light emission/exposure period according to this embodiment.

In (b) in FIG. 5, the length of the light emission/exposure period is modulated, so that each of the A0, A1, and A2 light emission/exposure periods is not the same. Moreover, the operation sequence is modulated, so that the operation sequence changes in each of the N division sets in such a manner that the operation sequence is A0, A2, and A1 in the first set and A1, A0, and A2 in the second set, instead of always operating in the order of the A0, A1, and A2 light emission/exposure periods.

(a) in FIG. 6 illustrates an example of an interference signal pattern in the case where the other TOF camera has no modulation whereas the TOF camera has a drive pattern obtained by dividing the light emission/exposure period and modulating the light emission/exposure period and its operation sequence according to this embodiment.

(b) in FIG. 6 illustrates exposure timing at the start of the A0 light emission/exposure period of the first set of the N division in the TOF camera according to this embodiment. Since the exposure state of the TOF camera and the interference signal from the other TOF camera completely match, a significant interference light component is mixed in exposure amount A0.

(c) in FIG. 6 illustrates exposure timing at the start of the A0 light emission/exposure period of the second set according to this embodiment. Since the interference signal from the other TOF camera partially overlaps the exposure state of the TOF camera, exposure amount A0 is partially influenced by the interference light.

(d) in FIG. 6 illustrates exposure timing at the start of the A0 light emission/exposure period of the Nth set of the TOF camera according to this embodiment. Since the interference signal from the other TOF camera is not present during the exposure state of the TOF camera, no interference light component is mixed in exposure amount A0.

Thus, while exposure amount A0 per one pulse always includes the interference light component in the above-mentioned typical driving method, in the driving method according to this embodiment, the interference light component included in exposure amount A0 per one pulse is not constant but varies.

When this light emission/exposure operation is repeatedly performed several 1000 times in one frame period, the integrated exposure amount will end up being an exposure signal including such an interference light component that averages the interference light variation. Likewise, the interference light component per one pulse included in each of exposure amounts A1 and A2 has variation, and the integrated exposure amount will end up being an exposure signal including an averaged interference component.

Therefore, in this embodiment, by dividing the light emission/exposure period and modulating the length and operation sequence of the light emission/exposure period, similarity in operation pattern to the other TOF camera can be eliminated and the interference light component included in each of exposure signals A0, A1, and A2 can be made equal.

Consequently, the interference light component included in the exposure amount is subtracted by difference calculation in distance calculation, with it being possible to suppress the influence of interference.

In this embodiment, the length and operation sequence of the light emission/exposure period are modulated randomly or in conformity with a specific rule. When modulating the length and sequence of the light emission/exposure period, such a rule that maintains the sum of the light emission and exposure periods constant between before and after the modulation may be set to prevent the modulation from affecting the dark current or the frame rate.

As described above with reference to the drawings, imaging device 1 and the solid-state imaging element used for the same according to this embodiment modulate the sequence and period of light emission/exposure, to uniformize the interference light component included in each exposure signal of the TOF camera. In detail, controller 13 outputs such a light emission control signal and exposure control signal that modulate at least one of: the length of the A0 light emission/exposure period, the A1 light emission/exposure period, and the A2 light emission/exposure period which are each a combination of the light emission period of light source 11 and the exposure period of light receiver 12; and the repetition sequence of the A0 light emission/exposure period, the A1 light emission/exposure period, and the A2 light emission/exposure period.

In more detail, controller 13 outputs such a light emission control signal and exposure control signal that increase or decrease the length of the A0 light emission/exposure period, the A1 light emission/exposure period, and the A2 light emission/exposure period randomly or in conformity with a specific rule, to modulate the length of the A0 to A2 light emission/exposure periods. Controller 13 also outputs such a light emission control signal and exposure control signal that change the repetition sequence of the A0 light emission/exposure period, the A1 light emission/exposure period, and the A2 light emission/exposure period randomly or in conformity with a specific rule, to modulate the repetition sequence of the A0 to A2 light emission/exposure periods.

In this way, the influence of interference light is suppressed by difference calculation included in distance-measuring calculation, so that the distance-measuring error caused by interference light (interference signal) from the other TOF camera can be reduced.

In addition, the problem associated with the case of adding an additional time to each light emission cycle, i.e. an increase in the size of circuitry for generating an additional time and memory (storage element, storage device) for storing an additional time pattern, can be avoided.

In this embodiment, when division number N of the light emission/exposure period is greater, the interference light component included in each exposure amount can be made more equal.

Although the other TOF camera has no modulation in this embodiment, the influence of interference can be equally suppressed even in the case where the other TOF camera has modulation to the length and operation sequence of the light emission/exposure period. By making the modulation pattern applied to the length and operation sequence of the light emission/exposure period different between the TOF camera and the other TOF camera, the influence of interference can be further suppressed.

Although the above describes the case where, while prioritizing synchronization between light emission operation and exposure operation, the same modulation is applied to at least one of the length of the light emission/exposure period and the operation sequence (repetition sequence) of the light emission/exposure period, imaging device 1 and the solid-state imaging element used for the same according to this embodiment are not limited to such. For example, different modulation may be applied to the light emission requirement (length of light emission time, repetition sequence of light emission time, etc.) and the exposure requirement (length of exposure time, repetition sequence of exposure time, etc.) of the light emission/exposure period. Alternatively, modulation may be applied to any of the light emission requirement and the exposure requirement, i.e. modulation may be applied to one of the light emission requirement and the exposure requirement and not applied to the other one of the light emission requirement and the exposure requirement.

The light emission requirement is not limited to the length of the light emission time or the repetition sequence of the light emission time, and includes any other requirement relating to light emission. Likewise, the exposure requirement is not limited to the length of the exposure time or the repetition sequence of the exposure time, and includes any other requirement relating to exposure.

Embodiment 2

The structure and operation of an imaging device and a solid-state imaging element used for the same according to Embodiment 2 are described below with reference to drawings, while mainly focusing on the differences from Embodiment 1.

Figure 7:
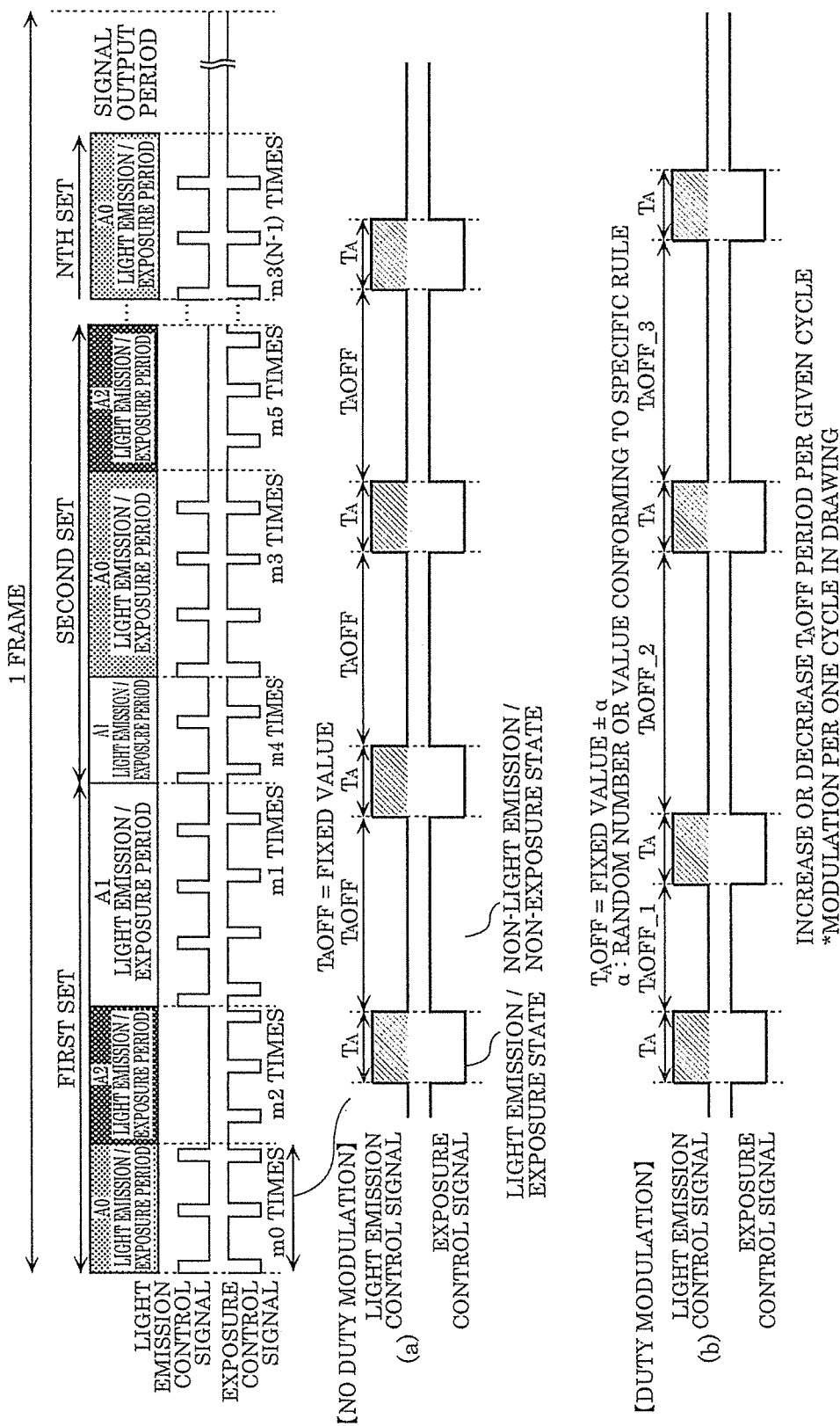
FIG. 7 is a sequence diagram illustrating light emission/exposure timing in an imaging device according to Embodiment 2.

FIG. 7 is a sequence diagram illustrating light emission/exposure timing in the imaging device according to Embodiment 2. (a) in FIG. 7 illustrates the timings of the light emission control signal and the exposure control signal in the light emission/exposure period. The period ($T_A$OFF) of the non-light emission state (light emission control signal: Low) and the non-exposure state (exposure control signal: High) is fixed.

In this embodiment, controller 13 outputs such a light emission control signal and exposure control signal that modulate the cycle (duty) of the light emission and exposure state while maintaining the phase relationship between the light emission control signal and the exposure control signal, in the A0, A1, and A2 light emission/exposure periods.

(b) in FIG. 7 illustrates an example of operation of modulating the duty. While maintaining the phase relationship between the light emission control signal and the exposure control signal, the time ($T_A$OFF) of the non-light emission state and the non-exposure state is changed randomly or in conformity with a specific rule.

This change amount may take not only a positive value but a negative value. By maintaining the total change amount of the increased or decreased $T_A$OFF period at 0, it is possible to prevent the modulation from affecting the dark current or the frame rate. To suppress the influence of interference light, the minimum unit of the increase/decrease amount is desirably greater than or equal to the light emission width. For example, in the case where the ratio between the light emission state and the non-light emission state before the duty modulation is 1:5, a ratio is selected from a combination of 1:3, 1:4, 1:5, 1:6, 1:7, and the like randomly or in conformity with a specific rule, to perform modulation.

Thus, in this embodiment, similarity in drive pattern to the other TOF camera can be further eliminated and the interference component included in each exposure signal amount can be made more equal, with it being possible to suppress the influence of interference.

Assuming that the interference light suppression effect is the same, combining the duty modulation with the modulation of the length and operation sequence of the light emission/exposure period can reduce an increase in the size of random number generation circuitry and memory required for the duty modulation, as compared with the case of performing only the duty modulation.

In detail, by initializing the modulation pattern when the light emission/exposure period of the first set ends to make the modulation pattern common to the sets, the necessary modulation pattern can be reduced by about 1/N. This further reduces an increase in the size of random number generation circuitry and memory. Moreover, by applying modulation while cyclically repeating fewer random number patterns, the size of random number generation circuitry can be reduced while suppressing the influence of interference light.

An example of the random number generation circuitry is a linear feedback shift register (LFSR). In this case, by changing an initial value (seed), a pseudo-random number corresponding to the seed can be generated.

For example, in the case where the ratio between the light emission state and the non-light emission state before the duty modulation is 1:5, an LFSR circuit of a dozen or so bits is prepared, and any 2 bits are extracted. Depending on their combination (00, 01, 10, 11), the duty is modulated as (1:3, 1:4, 1:6, 1:7). In the case where the same modulation continues such as when 00 is followed by 00, the code of the change amount is inverted (00 is converted to 11), thus improving randomness.

Although the above describes the case where, while prioritizing synchronization between light emission operation and exposure operation, the same modulation is applied to the cycles (duty) of the light emission and exposure states, imaging device 1 and the solid-state imaging element used for the same according to this embodiment are not limited to such. For example, different modulation may be applied to the cycles (duty) of the light emission and exposure states. Alternatively, modulation may be applied to any of the cycles (duty) of the light emission and exposure states, i.e. modulation may be applied to one of the cycles (duty) of the light emission and exposure states and not applied to the other one of the cycles (duty) of the light emission and exposure states.

Variation 1 of Embodiment 2

In this variation, controller 13 outputs the light emission control signal and exposure control signal for turning off the light emission control signal pulse and the exposure control signal pulse to further modulate the time ($T_A$OFF) of the non-light emission state and the non-exposure state.

FIG. 8 is a sequence diagram illustrating light emission/exposure timing in an imaging device according to the variation of Embodiment 2. (a) in FIG. 8 illustrates an example of a pattern in which the light emission control signal pulse and the exposure control signal pulse are turned off to further apply modulation. By turning off the light emission control signal pulse and the exposure control signal pulse of the second cycle, $T_A$OFF_1 of the first cycle is modulated to $T_A$OFF_1+$T_A$+$T_A$OFF_2. Thus, even when based on the same random number pattern, by modulating the part where the pulse is turned off, it is possible to generate a substantially different random number pattern and modulate the duty.

Variation 2 of Embodiment 2

In this variation, controller 13 outputs the light emission control signal and exposure control signal for skipping the light emission control signal pulse and the exposure control signal pulse.

(b) in FIG. 8 illustrates an example of a pattern in which the light emission control signal pulse and the exposure control signal pulse of one cycle are skipped. By skipping the light emission control signal pulse and the exposure control signal pulse of the second cycle, $T_A$OFF_2 is modulated to $T_A$OFF_3. A different random number pattern can thus be generated.

Other Embodiments

Although an imaging device and a solid-state imaging element used for the same according to the present disclosure have been described by way of the foregoing embodiments, an imaging device and a solid-state imaging element used for the same according to the present disclosure are not limited to the foregoing embodiments. Other embodiments obtained by combining any structural elements in the foregoing embodiments, modifications obtained by applying various changes conceivable by a person skilled in the art to the foregoing embodiments without departing from the scope of the present disclosure, and various appliances including an imaging device and a solid-state imaging element used for the same according to the present disclosure are also included in the present disclosure.

INDUSTRIAL APPLICABILITY

An imaging device and a solid-state imaging element used for the same according to the present disclosure are useful for, for example, three-dimensional measurement for which an interference phenomenon needs to be suppressed.

What is claimed is:

1. An imaging device that measures a distance to an object by performing a light emission and receiving reflected light from the object, the imaging device comprising:
    a controller that outputs, in each of a plurality of light emission-exposure periods, a light emission control signal controlling the light emission and an exposure control signal controlling an exposure;
    a light source that performs the light emission;
    a light receiver including a solid-state imaging element that outputs exposure signals generated as a result of the exposure; and
    a calculator that receives the exposure signals and calculates the distance,
    wherein the controller i) modulates a repetition sequence of the plurality of light emission-exposure periods each having a phase relationship between the light emission control signal and the exposure control signal that differ from one another, and further (ii) outputs the light emission control signal and the exposure control signal while maintaining the phase relationship in each of the plurality of light emission-exposure periods even when the repetition sequence is modulated, and
    wherein the controller outputs, in the plurality of light emission-exposure periods, the light emission control signal for modulating a ratio between a light emission state and a non-light emission state, or outputs the exposure control signal for modulating a ratio between an exposure state and a non-exposure state, and
    wherein the ratio between the light emission state and the non-light emission state and the ratio between the exposure state and the non-exposure state are modulated by skipping a pulse period of at least one cycle for each of a light emission pulse and an exposure pulse randomly or in conformity with a specific rule, the light emission pulse being the light emission control signal, and the exposure pulse being the exposure control signal.

2. The imaging device according to claim 1,
    wherein the ratio between the light emission state and the non-light emission state and the ratio between the exposure state and the non-exposure state are increased or decreased randomly or in conformity with a specific rule.

3. The imaging device according to claim 1,
    wherein the ratio between the light emission state and the non-light emission state and the ratio between the exposure state and the non-exposure state are modulated by turning off a light emission pulse and an exposure pulse randomly or in conformity with a specific rule, the light emission pulse being the light emission control signal, and the exposure pulse being the exposure control signal.

4. The imaging device according to claim 1, measuring the distance to the object based on a time of flight (TOF) method.

5. A solid-state imaging element used for an imaging device that measures a distance to an object by performing a light emission and receiving reflected light from the object, the imaging device including: a controller that outputs, in each of a plurality of light emission-exposure periods, a light emission control signal controlling the light emission and an exposure control signal controlling an exposure; a light source that performs the light emission at a timing according to the light emission control signal; the solid-state imaging element; and a calculator that receives a plurality of exposure signals and calculates the distance, the controller (i) modulating a repetition sequence of the plurality of light emission-exposure periods each having a phase relationship between the light emission control signal and the exposure control signal that differ from one another, and further (ii) outputting the light emission control signal and the exposure control signal while maintaining the phase relationship in each of the plurality of light emission-exposure periods even when the repetition sequence is modulated,
    wherein the solid-state imaging element performs the exposure at a plurality of different timings according to the exposure control signal, and outputs the plurality of exposure signals, and
    wherein the controller outputs, in the plurality of light emission-exposure periods, the light emission control signal for modulating a ratio between a light emission state and a non-light emission state, or outputs the exposure control signal for modulating a ratio between an exposure state and a non-exposure state, and
    wherein the ratio between the light emission state and the non-light emission state and the ratio between the exposure state and the non-exposure state are modulated by skipping a pulse period of at least one cycle for each of a light emission pulse and an exposure pulse randomly or in conformity with a specific rule, the light emission pulse being the light emission control signal, and the exposure pulse being the exposure control signal.

6. The solid-state imaging element according to claim 5, outputting the plurality of exposure signals of types that differ from each other in the phase relationship between the light emission control signal and the exposure control signal.

7. The solid-state imaging element according to claim 6, detecting background light or an offset component from one of the plurality of light emission-exposure periods.

8. The solid-state imaging element according to claim 5, being a charge coupled device (CCD) solid-state imaging element.

* * * * *